Feb. 20, 1934.  G. ATTERBURY  1,947,510
CAMERA
Filed Nov. 16, 1931   4 Sheets-Sheet 1
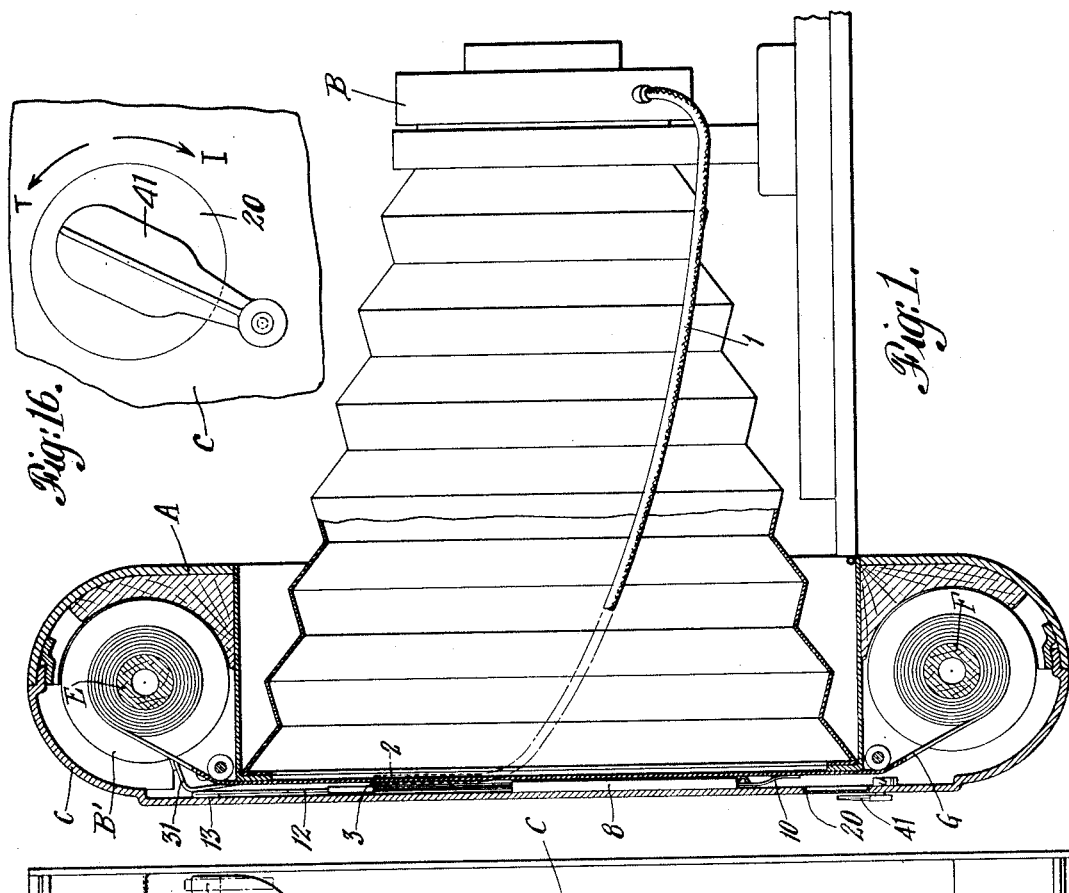
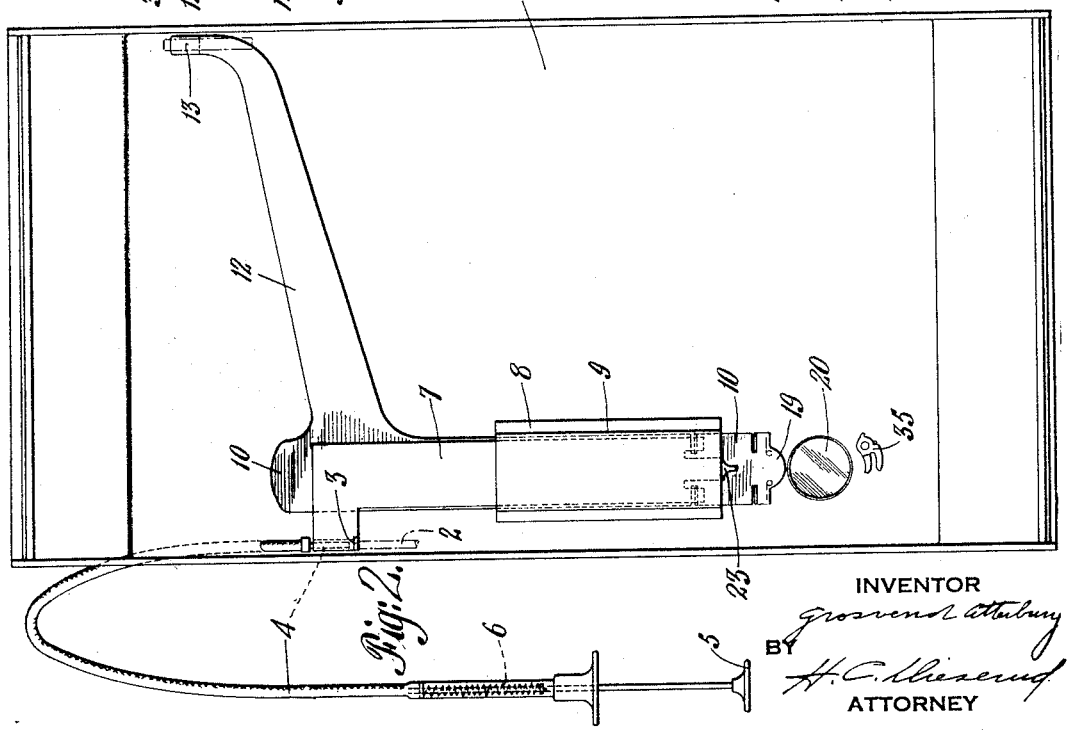
INVENTOR
Grosvenor Atterbury
BY
H. C. Meserung
ATTORNEY Feb. 20, 1934.   G. ATTERBURY   1,947,510
CAMERA
Filed Nov. 16, 1931   4 Sheets-Sheet 2
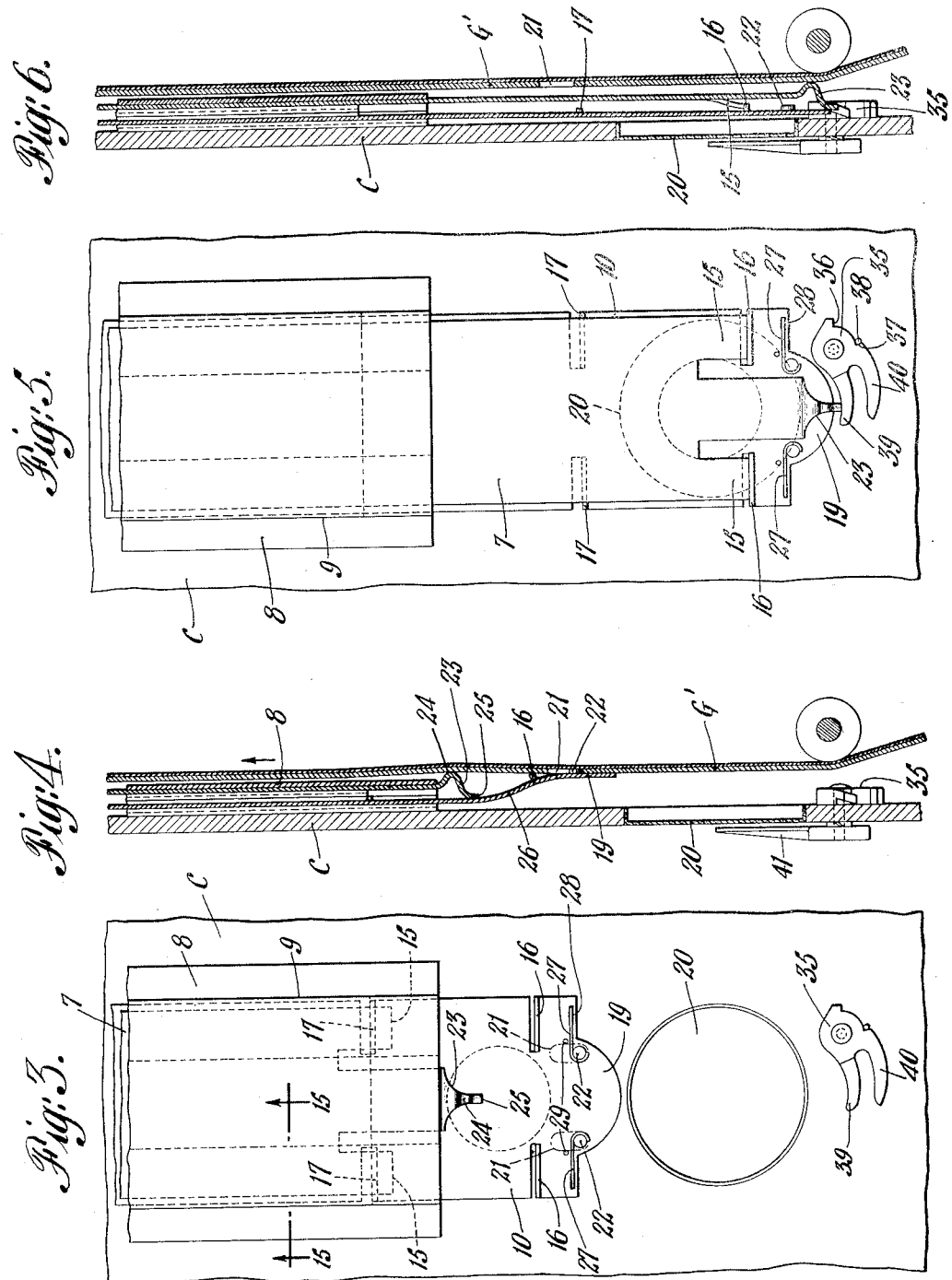

Feb. 20, 1934.  .G. ATTERBURY  1,947,510
CAMERA
Filed Nov. 16, 1931   4 Sheets-Sheet 3
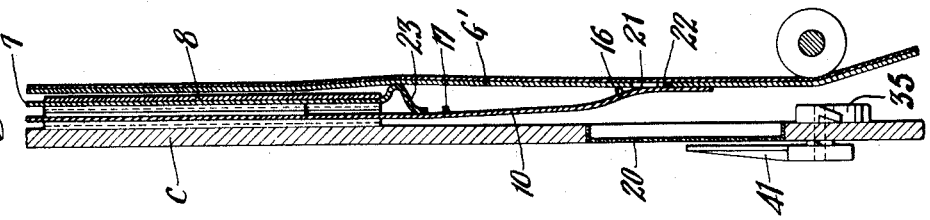
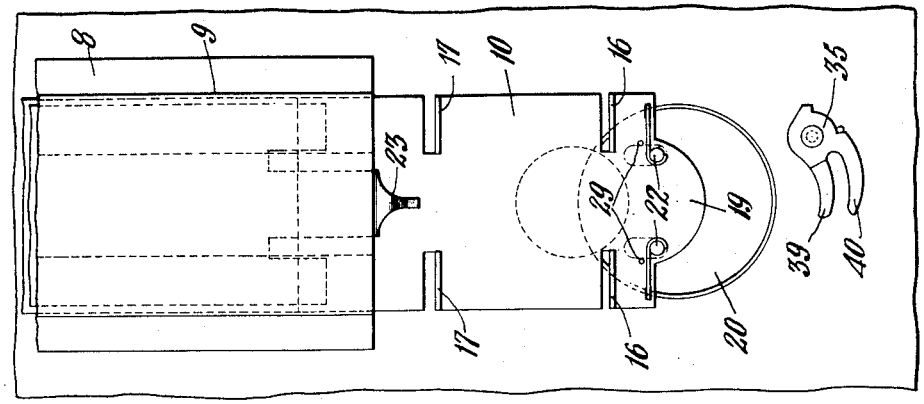
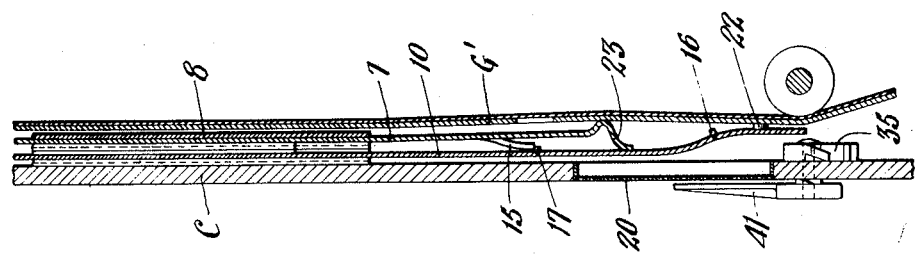
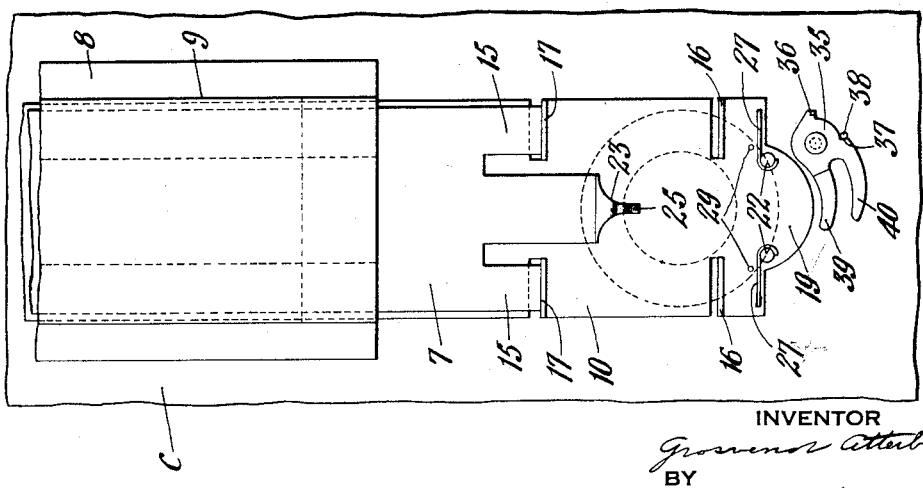
INVENTOR
Grosvenor Atterbury
BY
H.C. Chesserich
ATTORNEY Feb. 20, 1934.　　　　G. ATTERBURY　　　　1,947,510
CAMERA
Filed Nov. 16, 1931　　　4 Sheets-Sheet 4
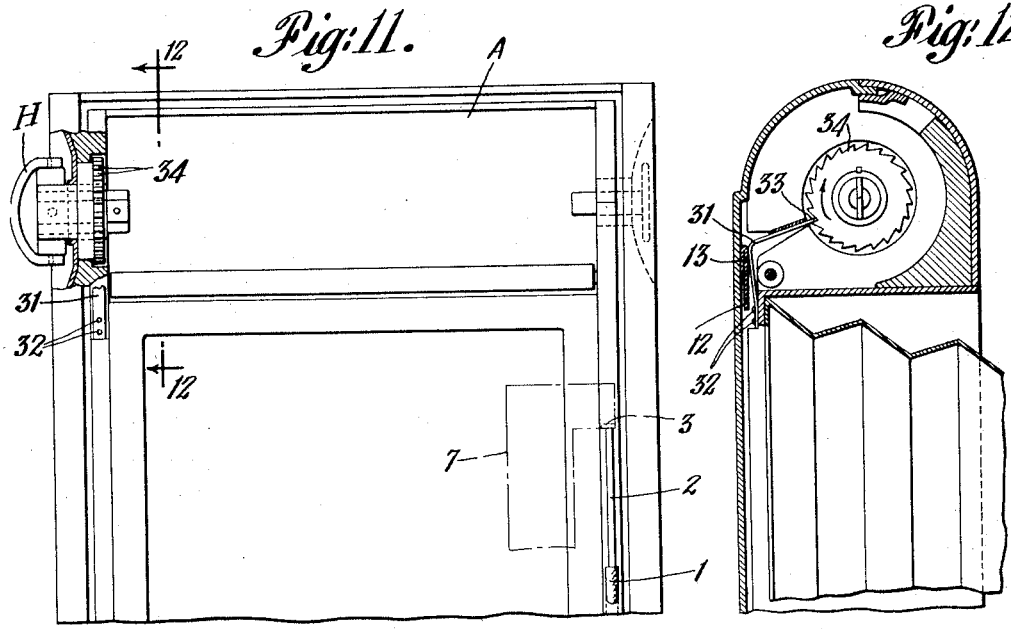
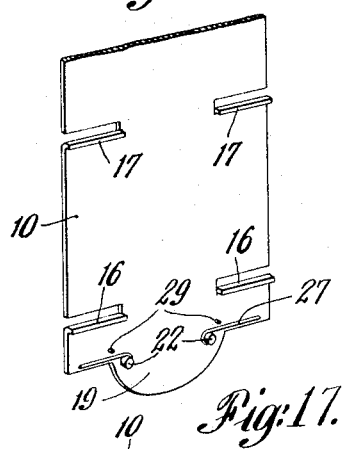
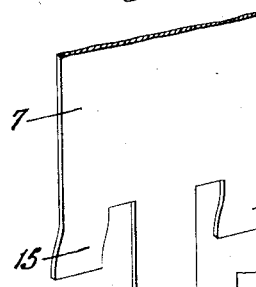
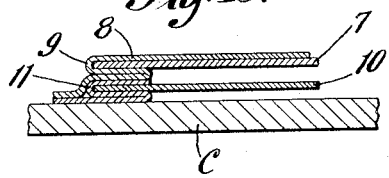
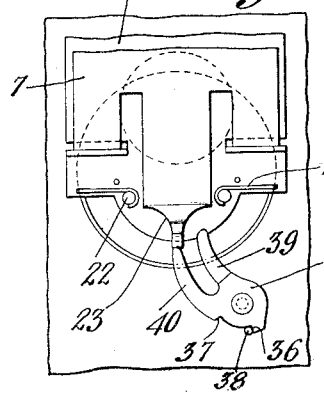
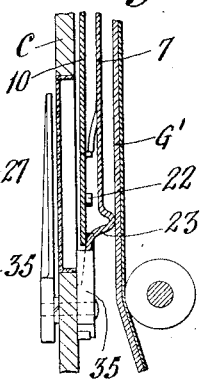
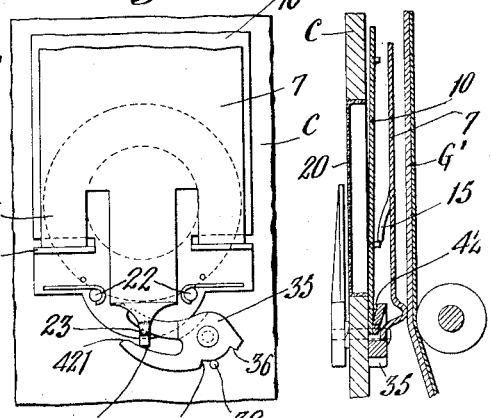
INVENTOR
Grosvenor Atterbury
BY
H. C. Mieserich
ATTORNEY Patented Feb. 20, 1934

1,947,510

UNITED STATES PATENT OFFICE 1,947,510

CAMERA

Grosvenor Atterbury, New York, N. Y.

Application November 16, 1931
Serial No. 575,201

19 Claims. (Cl. 95—32)

This invention relates to cameras and more particularly to safety devices for preventing double exposure of a single film section and for preventing the shifting of an unexposed film section beyond the exposure position.

In cameras, especially those in which a roll of film is used and the sections of the film are successively advanced into position for exposure, amateur photographers have been known inadvertently to open and close the shutter more than once without bringing a new section of the film into position, with generally highly unsatisfactory results. An object of the invention hence resides in the provision of improved mechanism for positively preventing a second operation of the shutter until the next section of the film is in position. More particularly, means are provided for locking the shutter control device, the locking action being effected upon the first operation of the shutter, and the lock being automatically released upon the subsequent advance of the film. The invention also involves the provision of a warning flag adapted to register with the opening ordinarily provided in the back of a camera of this character for viewing a number designating the film section which is in exposure position, said flag being operated in conjunction with or in coordination with the lock mechanism.

Another object of the invention is to provide means for accurately and positively stopping the advance of the film at the point where a section is in position for exposure, in order to prevent the film from being advanced too far, with resultant waste of film or super-position of portions of two pictures taken. Still another object is to combine this film stopping mechanism with the devices which prevent repeated operations of the shutter.

An additional feature of the invention resides in the adaption of the usual backing or covering of a film for controlling certain of the operations mentioned.

Still further objects reside in the provision of mechanism of the character stated which is simple and inexpensive to manufacture, efficient in operation, and capable of incorporation in cameras of the type most commonly in use at the present time, without complicated changes in the structure of the cameras themselves.

A further object resides in the provision, in conjunction with other features of the invention, of mechanism for permitting the taking of time exposures, and more particularly of mechanism for preventing the operation of the shutter control lock during a single operation of the control device in the taking of a time exposure, but for automatically rendering the lock effective thereafter.

Other objects and advantages of the invention will be in part apparent and in part pointed out in connection with the following detailed description of a preferred embodiment of my invention, reference being had to the accompanying drawings, wherein:

Fig. 1 is a side elevation, partly in section, of a camera embodying my invention. Fig. 2 is a face view of the inside of the back of the camera shown in Fig. 1. Figs. 3, 5, 7 and 9 are face views, on enlarged scale, of the inside of the back cover showing locking mechanism in accordance with the invention, the various views showing the parts in different operating positions, as will hereafter be more particularly described. Figs. 4, 6, 8 and 10 are central sections taken respectively through Figs. 3, 5, 7 and 9, showing the parts in corresponding different positions. Fig. 11 is a view of the upper part of the camera, taken from the back, and partly broken away, illustrating particularly parts of the mechanism for locking one of the film reels to prevent advance beyond the desired point. Fig. 12 is a section taken on the line 12—12 of Fig. 11 looking in the direction of the arrows. Figs. 13 and 14 are detailed views in perspective of certain locking members employed in accordance with my invention. Fig. 15 is a section taken on the line 15—15 of Fig. 3. Fig. 16 is a detailed view of finger operable mechanism for setting the camera for a time exposure and Figs. 17, 18, 19 and 20 are detail views showing the time exposure lock in positions before and after the first operation of the shutter actuating mechanism, respectively.

Referring particularly to Figs. 1 and 2, there is shown at A the main body portion of a camera which includes a shutter B and a back cover member C, the camera being adapted in this case to receive spools or reels E and F for carrying a film G, all as is common in cameras of ordinary types. The camera is shown provided with the usual flexible shutter operating cable 1, which for purposes of the present invention may be extended toward the rear of the camera and secured on the main portion A thereof in such position that its operating plunger 2 extends beyond the cable housing and terminates at a point where it may be engaged by a shoulder 3 carried by a member connected with another cable 4 secured to the back piece C of the camera. This cable 4 is shown provided with the usual thumb operable member 5, adapted to be held in extended position by a spring 6. Upon moving the member 5 inwardly, as in the usual operation of a camera, the shoulder 3 will engage the plunger 2 of the cable 1 and operate the shutter.

Secured to the end of the cable 4, there is an operating member 7 which, as shown, is generally L-shaped, and carries the shoulder 3 previously mentioned. This member 7 is preferably carried beneath a retaining plate 8 which may be secured to the back member C of the camera in any suitable manner and provided with grooves 9 in which the sides of the member 7 are adapted to slide. A locking member 10 is shown located beneath the operating member 7 and adapted to travel in grooves 11, similar to grooves 9 also carried by the back of the camera. This locking member 10 is shown preferably formed with an arm 12 extending in convenient configuration to avoid interfering with the autographic feature now commonly used in cameras of this type, and having an end 13 cooperating with means for locking the reel E through mechanism hereafter described. Both the members 7 and 10 are preferably formed of thin sheet metal, and are thus compact and at the same time strong.

Turning now to Figs. 3 to 10, the construction and operation of the locking mechanism shown for preventing a repeated operation of the shutter under the conditions mentioned will be described in detail. In Figs. 3 and 4, the parts are shown in the positions they occupy when a section of film has been advanced into proper position for exposure, but before the shutter has been operated to take a picture. With the parts in these positions, upon actuating the thumb piece 5, the cable 4 and the slide 7 which is secured thereto, will be advanced toward the bottom of Fig. 3, whereupon fingers 15 formed at either side of the operating member 7, which lie above the surface of the lock member 10, will advance until they reach shoulders 16 extending outwardly from the lock member as best illustrated in Fig. 13. These shoulders may advantageously be simply struck up from the sheet material of which the member 10 is formed. At this stage, by reason of the fact that the lock member is composed of some resilient material such as sheet metal and is shaped so that its forward end tends normally to rise, as viewed in Fig. 3, the fingers 15 will engage the shoulders 16 and advance the lock member during the continued movement of the operating member. In this connection, it may be noted that the parts are so arranged that a certain predetermined travel of the operating member and lock member is permitted before the operating member through shoulder 3 and cable 1 operates the shutter. Thus, it is only toward the end of the travel of the lock and operating members, for instance, as they approach the position shown in Fig. 5, that the shutter is actually operated. With the ordinary type of exposure of, say, a small fraction of a second, the photographer will promptly release the thumb piece 5 with the result that the spring 6 will retract the operating member 7 and withdraw its fingers 15 to the positions in which they lie in Fig. 9. As the lock member is made of resilient material, and when shifted into locking position is adapted to spring upwardly at its forward end from the normal plane of the member, a pair of rear shoulders 17, preferably struck up in the same way as the shoulders 16, will be brought into the path of the fingers 15. The shoulders 17 thus will prevent the shutter from being operated a second time. Any suitable stop, not shown, may be provided for preventing advance of the lock member beyond a predetermined point.

After a picture has been taken, the photographer may wish to know without attempting to actuate the shutter whether the camera is ready for the taking of another picture or whether the film must first be shifted. Therefore, in order to provide a visual indicator which will show the operator that the parts are in locked position, it is preferred to so construct the locking member that when the lock is effective a forwardly extending portion 19 thereof lies beneath the window 20, ordinarily provided in the backs of cameras for viewing the usual numbers provided on films. This extension 19 may be termed a flag and may be suitably colored or marked so that the photographer by glancing through the window 20 will quickly appreciate that he must advance a new film section into position. It will thus be appreciated that there are combined in a simple construction, means for not only positively locking the shutter operating mechanism but also for giving a visual indication that this mechanism is locked.

The photographer, finding the shutter operating member locked, will be prompted to turn the usual key H, for advancing a new section of film into exposure position, with the result that the film will advance in the direction of the arrow in Fig. 4 until elongated holes or slots 21 in the film backing G', as shown in Fig. 8, are brought above pins 22 carried on the locking member. The operating member having been withdrawn by virtue of the action of spring 6, the end of the locking member, which is bent toward the film, will spring upwardly so that the pins 22 will bear against the film backing and will enter the slots 21 as the latter arrive above the pins. As the film continues to advance, it will accordingly retract the locking member until the parts approach their positions shown in Fig. 4. The upper guide walls of the groove 11 are cut away sufficiently to permit the shoulders 17 to pass in under the fingers 15. Furthermore, the grooves 11 may also be made to deflect the end of the locking member with its shoulders 17 downwardly as the locking member is being returned. This will insure bringing the locking shoulders below the plane of the fingers 15 so that the parts may assume their initial positions. At the same time that the locking member is restored or withdrawn, it will be understood that the flag 19 is removed from the window 20. In order to enable the locking member to advance, as explained, upon the next operation of the shutter, it is necessary to withdraw the pins 22 from the slots 21 in the film backing G'. For this purpose, a forwardly projecting extension 23 of the operating member is brought into play. This extension is formed with a convex portion 24 adjacent the film backing adapted to push the film slightly upwardly, and with an end 25 adapted to push downwardly on the sloping portion 26 of the locking member so as to withdraw the pins 22 from the holes in the film backing upon advance of the operating member. It will be observed that the operating member 7 has a considerable idle movement prior to engagement of the fingers 15 with the shoulders 16 so that ample time is provided for the disengagement of the pins 22 from the holes 21. The pins 22 are preferably resiliently carried by the locking member through spring arms 27 of suitable material which may be secured to the locking member, as at 28 in any convenient manner. These spring arms are designed to make allowance for any mis-alignment of the holes in the film and thus they insure equalization of the pull of the film on the locking member. The resilience of the pin mounting serves also to prevent tearing of the backing particularly during initial advance of the film when the force required to move the locking member is greatest. The spring arms are preferably adapted, after a slight movement, to go solid against pins 29 located slightly rearwardly of the spring arms. If the holes 21 are mis-aligned only one of the arms will go solid, unless the paper yields sufficiently adjacent one of the pins to take care of the mis-alignment.

As already indicated, in order to prevent each film section from being advanced beyond exposure position, the end of arm 12 secured to or integral with the locking member is arranged to engage a spring arm 31 secured to the camera frame as by rivets 32. That is to say, during the final movement of the lock 10, element 13, as best shown in Fig. 12, engages the spring arm 31 and forces the pawl 33 on the end of the arm into engagement with teeth 34 which may be formed on the usual end plate B' of a spool for the film or in a separate disc splined to the stem of the film winding key. In this way, a positively acting construction is provided for stopping the advance of the film under control of the holes 21 therein. These holes being definitely related to the exposure positions of the film, accidental overwinding is prevented.

It will be understood that it is desirable to have the teeth on the spool arranged so that the pawl 31 will start to enter the depression between two teeth just as the top of one tooth has passed the pawl. In this way, sufficient rotation of the spool is allowed for, before the pawl engages the radial front wall of the next tooth, to enable the film to advance the locking member to a point where the pawl is fully depressed by end 13 of arm 12.

It will be apparent that just after the locking member is depressed by advance of the end 25 of the extension 23 on the operating member, to withdraw the pins from the film backing and the locking member is given a slight movement it releases the locking arm 31 to free the spool E so that immediately after operating the shutter the film may be advanced without any other action on the part of the operator.

As is well understood, in making a time exposure, the shutter operating device is actuated once in order to open the shutter, and a second time in order to close the shutter. The construction above described, however, would prevent a second operation of the shutter operating cable, and hence would preclude the use of the camera in taking time exposures. Mechanism has, therefore, been provided, cooperating with the structure described, for holding the locking mechanism in inoperative position following one operation of the shutter control and for releasing the locking device for operation upon a second operation of the shutter control. This mechanism may take the following form.

In the drawings, a member 35 is shown pivoted on the back of the camera and having shoulders 36 and 37 for limiting its rotation by abutment against a pin 38. This member has forked portions 39 and 40 which may be shaped as shown in the drawings, for purposes hereafter described. When it is desired to take a time exposure, this member can be turned by means of thumb piece 41 secured to the same pivot stud on the outside of the back of the camera so that its shoulder 36 comes against the pin 38. Thereupon, when the members 7 and 10 are advanced by operation of the plunger 5, the end of member 7 will strike the end of arm 40, urging the member 35 to swing about half way back to normal or into its position shown in Fig. 18, while the locking member 10 which will be held flat by the end 25 of the operating member will be forced under the arm 39 and will be retained in depressed position beneath arm 39 as the operating member is retracted, with the result that the shoulders 17 are held below the path of the ends of extensions 15. If desired the under surface of the arm 39 of member 35 may be provided with a cam face 42 which will tend to cam the end of the member 10 further toward the back of the camera as it is shifted under the arm 39. This will insure carrying the shoulders 17 out of the path of fingers 15. The operating member 7 is thus free to take its full travel, toward the end of which, its end 25 will strike the arm 39 of member 35 throwing it into its original inoperative position. It will be understood that as the operating member is retracted, the first time, its end must slide over arm 39 which is between it and the locking member. To more readily permit this action the upper surface of arm 39 may be bevelled. The arm 40 may be provided with a downwardly extending shoulder 421 adapted to engage the end of the locking member to prevent the member 35 from swinging back to its fully shifted position upon retraction of the operating member or friction may be relied upon for this purpose. The thumb piece 41 may be provided, for example, with friction points cooperating with indentations in the back cover. A certain amount of friction is desirable also to prevent accidental shifting of the piece 41. The thumb piece 41 may advantageously be constructed so that it overlies window 20 when set for a time exposure, that is, in its position shown in Fig. 17.

Summarizing the operation of the present improvement it will be observed that by the provision of two simple, sliding members in conjunction with the parts now ordinarily found in a camera, and with very little additional modification the camera may be made substantially "fool proof". It is not possible to take a second exposure upon the same section of film and it is not possible to waste a section of film by shifting the film beyond the next exposure position after a picture has been taken. The two locking features, i. e. shutter lock and film lock, are so inter-related that the camera may be successfully operated to take a series of pictures without paying any attention to the numbers appearing on the back of the film. Each operating member, i. e. shutter operating member and film winding member, serves to lock itself in the course of its operation and is released upon an operation of the other member.

While the invention has been mainly described in connection with a sliding or plunger form of locking member, it will be understood that members pivoted at one end and free to swing at the other could be employed in similar fashion. That is, a pivoted member could be readily adapted to cooperate with the operating member in the same manner as the sliding member.

Furthermore, while the invention has been shown as applied to a camera of the roll film type it will be appreciated that it may readily be adapted to other types of cameras such as those employing film packs or plates.

Moreover, the terms and expressions which I have employed are used as terms of description and not of limitation, and I have no intention, in the use of such terms and expressions, of excluding any equivalents of the features shown and described, or portions thereof, but recognize that various modifications are possible within the scope of the invention claimed.

What I claim is:

1. In a camera including a shutter, actuating means therefor, and a film including a light sensitive member and a covering, means operatively controlled by said actuating means to lock the same, and means controlled by the film covering independently of the light sensitive member to return the locking means to inoperative position.

2. In a camera a film carried by the camera having a covering with a slot formed therein and an imperforate light sensitive member, a shutter, and actuating means therefor, means to lock the actuating means to prevent operation of the shutter, said locking means being controlled by the actuating means, and means controlled by said slot in the film cover for withdrawing the locking means from operative position.

3. In a film-receiving camera including a shutter, the combination of means adjacent the path of the film rendered effective upon operation of the shutter for preventing a further operation of the shutter, means for moving said first mentioned means to inoperative position, and means controlled by the first named means for positively preventing advance of the film beyond a succeeding exposure position.

4. In a camera including a shutter, and a spool for receiving a film, the combination of means adjacent the film rendered effective upon operation of the shutter for preventing a further operation of the shutter, said means being moved to inoperative position by engagement with and under control of said film, and means controlled by the first-named means for positively preventing advance of the film beyond a succeeding exposure position.

5. In a camera a shutter, a device for actuating the shutter, means at the back of the camera for locking said device against a repeated operation, and means for maintaining the locking means inoperative upon an operation of the shutter and for automatically rendering it operative upon a second operation of said device.

6. In a camera, a shutter, a device for actuating the shutter, means for locking said device against a repeated operation comprising a member connected to said device, a member engageable by the first-named member for movement thereby, and means on the second named member for locking the first named member upon retraction of the first-named member with respect to the second.

7. In a camera, a shutter, a device for actuating the shutter, means for locking said device against a repeated operation comprising a member connected to said device, and a member engageable by the first-named member for movement thereby, said members having interlocking means effective upon predetermined movement of the first-named member to prevent a second operation thereof, said interlocking means permitting retraction of the second mentioned member.

8. In a camera, a shutter, a device for actuating the shutter, means for locking said device against a repeated operation comprising a member connected to said device, a member engageable by the first-named member for movement thereby, a shoulder on one of said members adapted to prevent operation of said first-mentioned member, and means for withdrawing the shoulder to permit operation of said member.

9. In a camera having a shutter and an actuating device therefor, a flat movable member adjacent said device, said member having a portion adapted to spring out of the normal plane of the member for locking the actuating device.

10. In a camera having a shutter and an actuating device therefor, a flat movable member adjacent said device, said member having a portion adapted to spring out of the normal plane of the member for locking the actuating device, and said member carrying a signal adapted to move to warning position upon actuation of the member to locking position.

11. In a camera having a shutter and an actuating device therefor, a flat movable member adjacent said device, said member having a portion adapted to spring out of the normal plane of the member for locking the actuating device, and means for moving said member to return said portion to the normal plane of the member.

12. In a camera, a shutter, operating means therefor, film shifting means, and a member directly engageable by said operating means and positively movable thereby to lock the operating means against further operation, said member being restored to its normal inoperative position upon operation of said film shifting means.

13. In a camera, a shutter, operating means therefor, film shifting means, a member directly engageable by said operating means and positively movable thereby to lock the operating means against further operation, said member being restored to its normal inoperative position upon operation of said film shifting means, and means operated upon the return of said member for locking said film shifting means.

14. In a camera, film supporting means adapted to carry a sensitized film having a backing, means for shifting the film, positive means for engaging said shifting means to lock the same, and means controlled by said film backing independently of the sensitized portion of the film for governing said positive means.

15. In a camera a casing having a detachable back, shutter operating means, and means mounted on said back adapted to cooperate with said shutter operating means to actuate the same and to simultaneously lock the same against further actuation.

16. In a camera a casing having a detachable back, shutter operating means, film shifting means, locking means therefor, and means mounted on said back adapted to cooperate with said shutter operating means to actuate the same and to simultaneously lock the same against further actuation and for controlling the locking means for said film shifting means.

17. In a device of the class described a shutter, operating means therefor, means for supporting and advancing a film comprising a light sensitive portion and a backing, said backing having a series of perforations therein at spaced points, and means for locking said operating means upon a single operation thereof, said locking means being arranged on the backing side of said film and cooperating with said perforations to render the lock ineffective.

18. In a device of the class described a shutter, operating means therefor, means for supporting and advancing a film comprising a light sensitive portion and a backing, said backing having a series of perforations therein at spaced points, means for locking said operating means upon a single operation thereof, said locking means being arranged on the backing side of said film and cooperating with said perforations to render the lock ineffective, and means controlled by said locking means for preventing operation of said film advancing means when a new light sensitive portion has been brought into exposure position.

19. In a device of the class described film supporting and winding means, a photographic film carried by said means, said film comprising an imperforate light sensitive member and a backing member having a series of perforations adjacent one edge, said perforations being coordinated with successive sections of said light sensitive member, a casing having a window adjacent the edge of said film bearing the perforations, and means adapted to be brought beneath said window cooperating with said perforations.

GROSVENOR ATTERBURY.